(12) United States Patent
Asano et al.

(10) Patent No.: US 6,633,902 B1
(45) Date of Patent: Oct. 14, 2003

(54) COMMUNICATION CACHE MANAGEMENT DEVICE AND METHOD THEREFOR

(75) Inventors: Katsuhito Asano, Kawasaki (JP); Haruo Moritomo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/551,103

(22) Filed: Apr. 18, 2000

(30) Foreign Application Priority Data

Apr. 19, 1999 (JP) ............................................. 11-110813

(51) Int. Cl.[7] .............................................. G06F 15/16
(52) U.S. Cl. ...................... 709/203; 709/202; 709/211; 709/214; 711/133; 711/136
(58) Field of Search .......................... 709/211–216, 203, 709/202; 711/133, 136

(56) References Cited

U.S. PATENT DOCUMENTS

| | | | | |
|---|---|---|---|---|
| 5,630,097 A | * | 5/1997 | Orbits et al. ................. | 711/165 |
| 5,943,410 A | * | 8/1999 | Shaffer et al. ........... | 379/213.01 |
| 5,991,773 A | * | 11/1999 | Tagawa ...................... | 707/203 |
| 6,049,850 A | * | 4/2000 | Vishlitzky et al. .......... | 711/136 |
| 6,094,674 A | * | 7/2000 | Hattori et al. ............... | 709/203 |
| 6,173,311 B1 | * | 1/2001 | Hassett et al. .............. | 709/202 |

FOREIGN PATENT DOCUMENTS

| | | |
|---|---|---|
| JP | 9-298554 | 11/1997 |
| JP | 10-145373 | 5/1998 |

* cited by examiner

*Primary Examiner*—David Wiley
*Assistant Examiner*—Phuoc H. Nguyen
(74) *Attorney, Agent, or Firm*—Karten Muchin Zavis Rosenman

(57) ABSTRACT

The invention relates to a network emulating a local network, and particularly provides a communication cache management device that uses, e.g., an MPOA for efficiently transmitting LAN data within an ATM network, and a method therefor. A communication cache management method at an ingress communication client side includes the steps of: monitoring a data flow that is transmitted to an ingress communication server within a predetermined time period before a time-out of an aging timer after a shortcut has been set; re-starting an aging timer when there has been detected a data flow that exceeds a predetermined value; timing out the aging timer when there has been detected no data flow that exceeds the predetermined value; and timing out the aging timer when the contents of a response message to a communication address resolution request message do not permit a cache refresh.

5 Claims, 10 Drawing Sheets

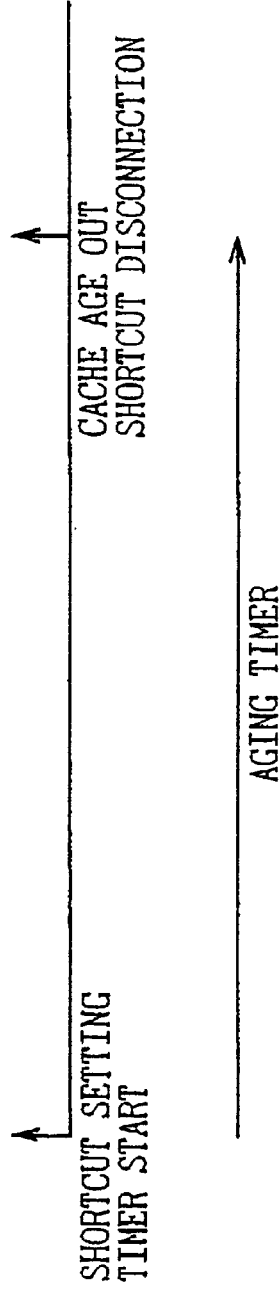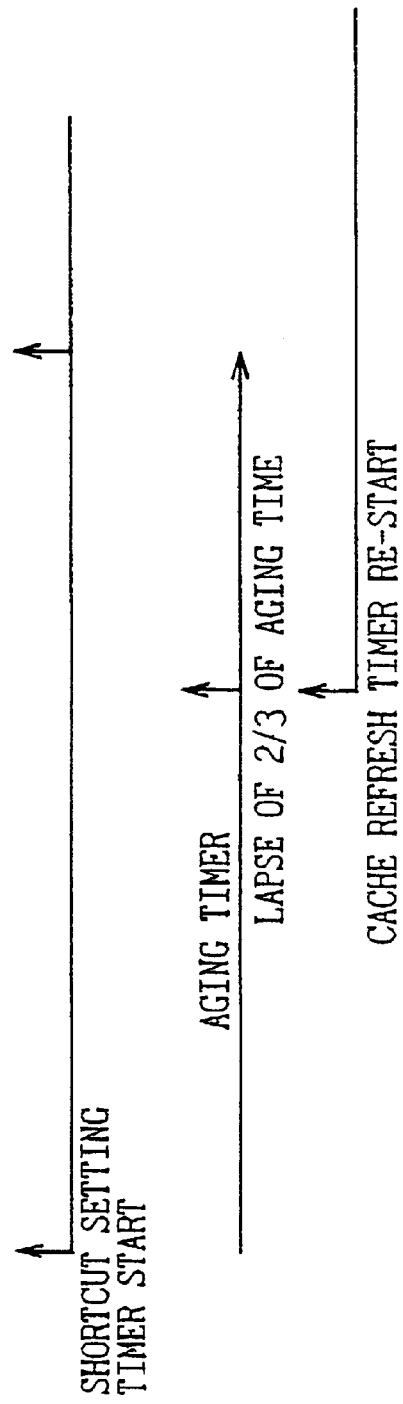

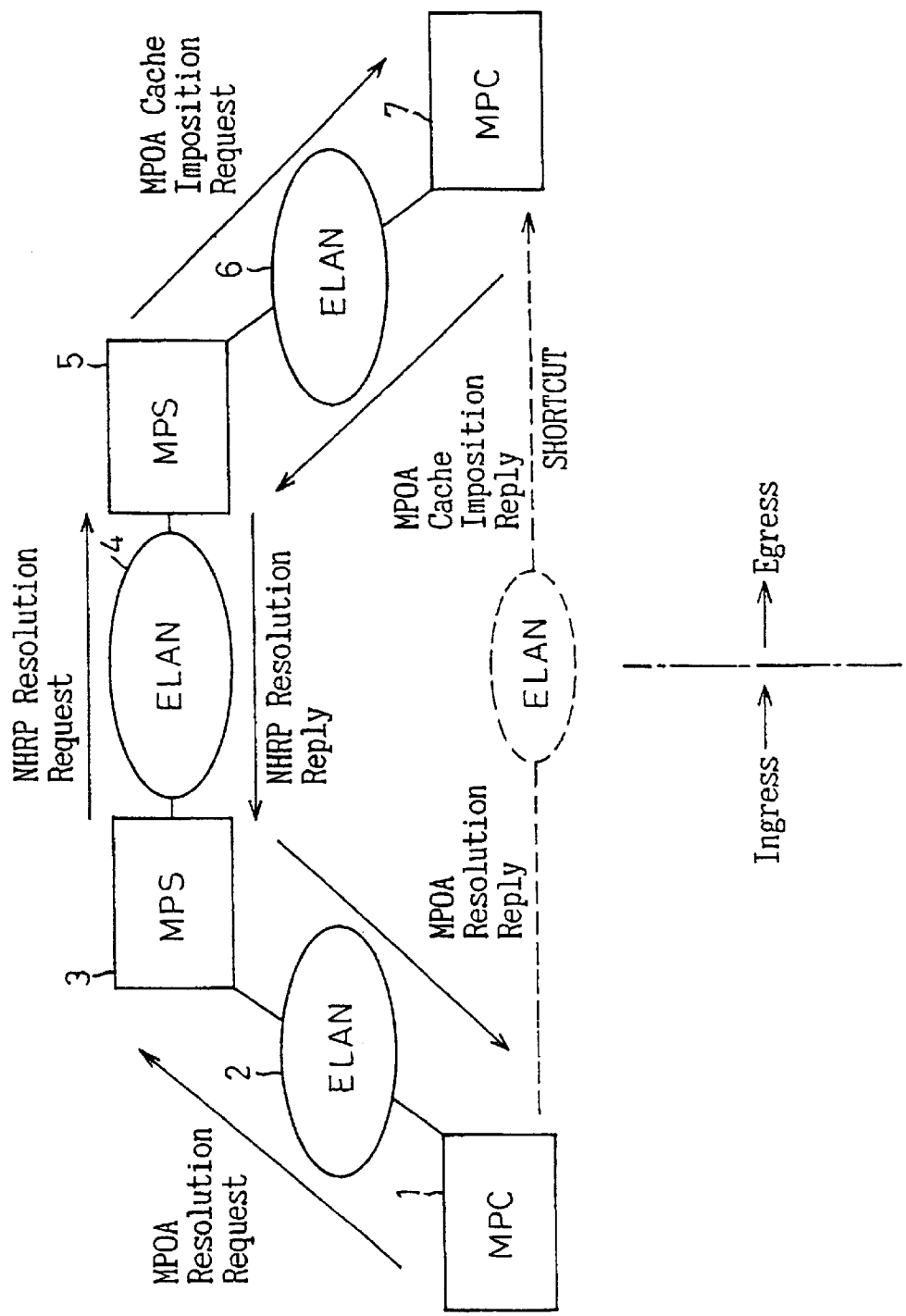

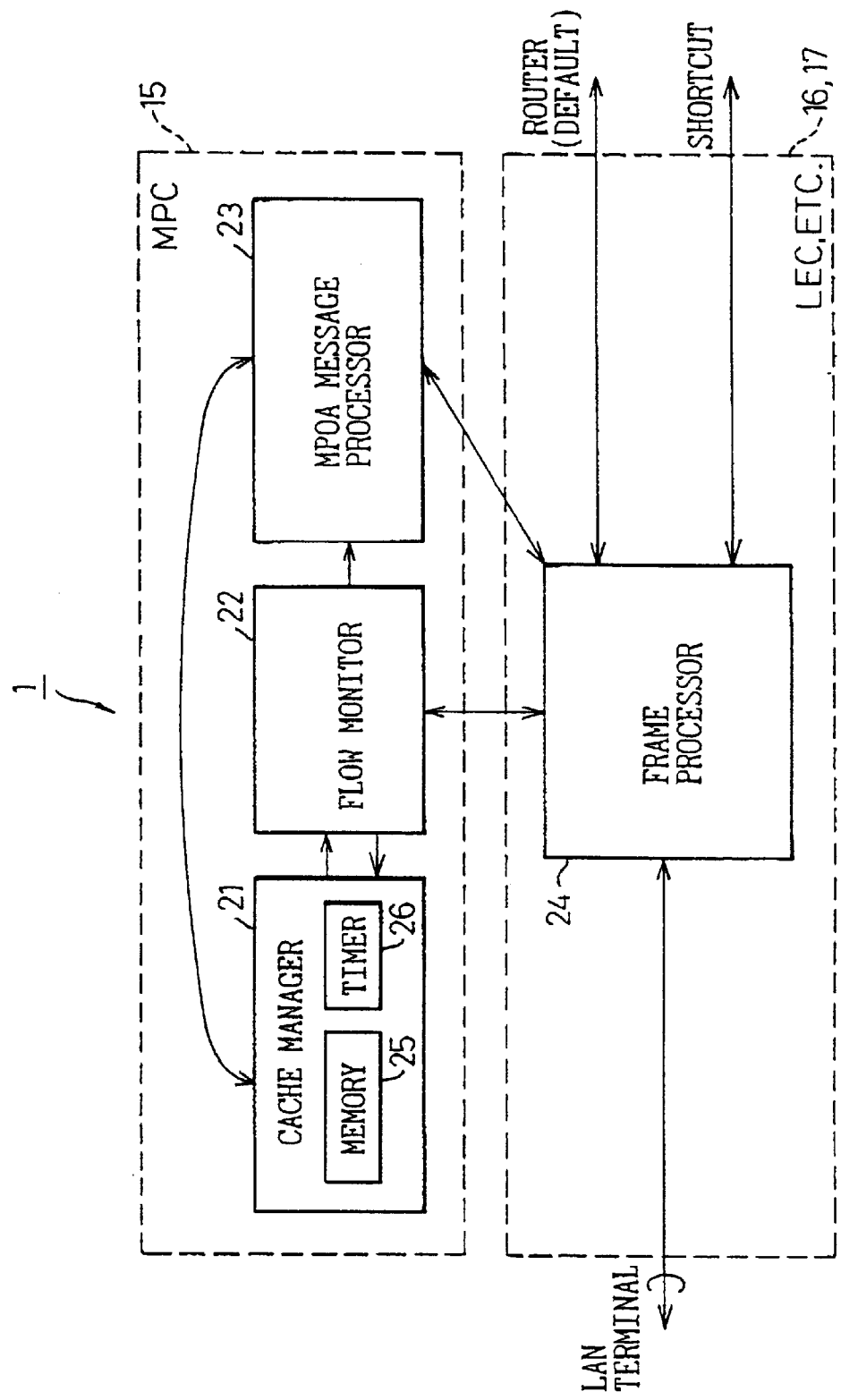

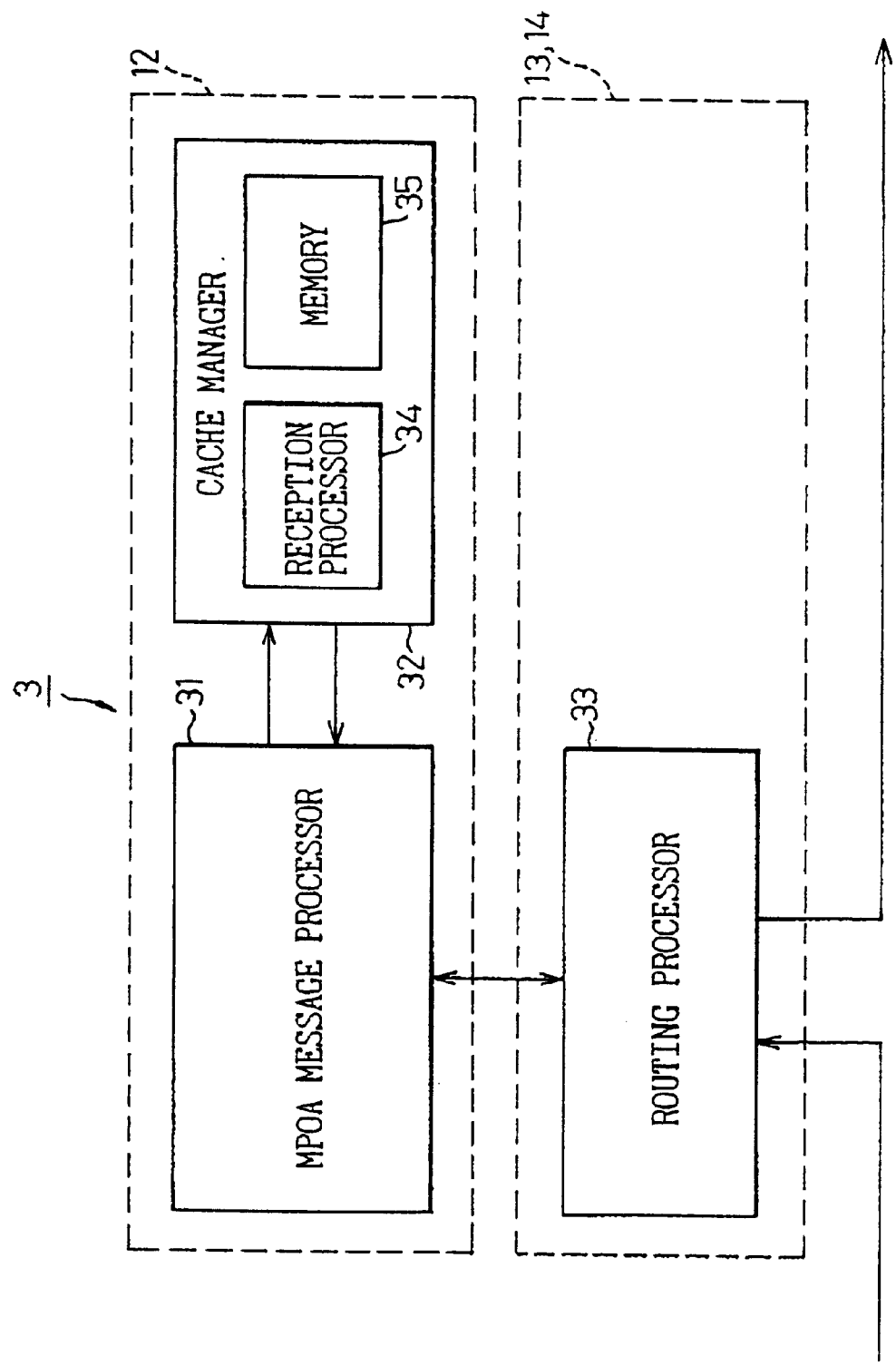

Fig.6A

| KEYS | | CONTENTS | |
|---|---|---|---|
| MPS ATM Address | IP Address | Dest. ATM Address or VCC | Encapsulation Information | Other information |

Fig.6B

| KEYS | | | CONTENTS | |
|---|---|---|---|---|
| Destination IP Address | Source/Dest. ATM Address | Tag (Optional) | LEC | DLL header | Other information |

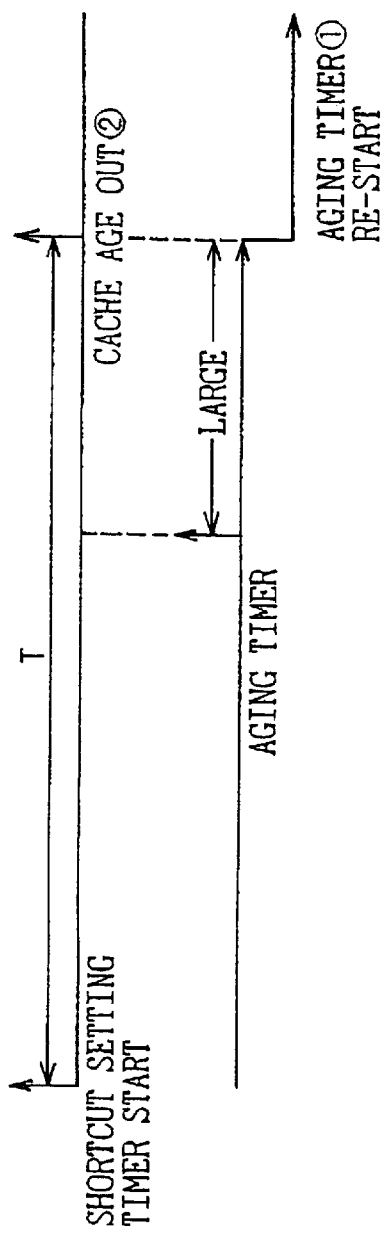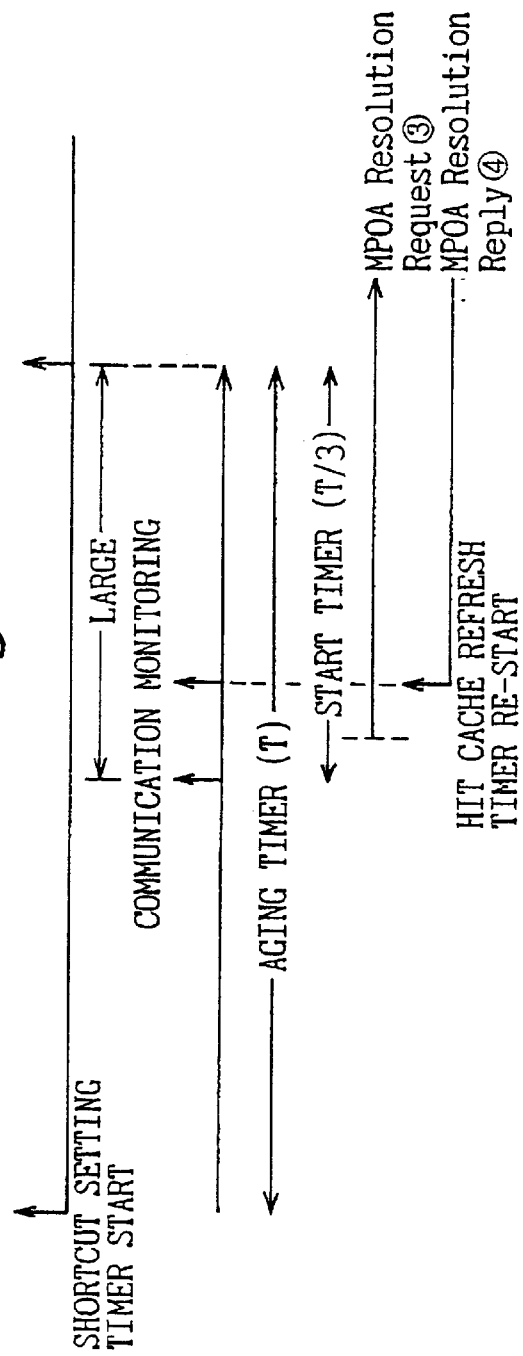

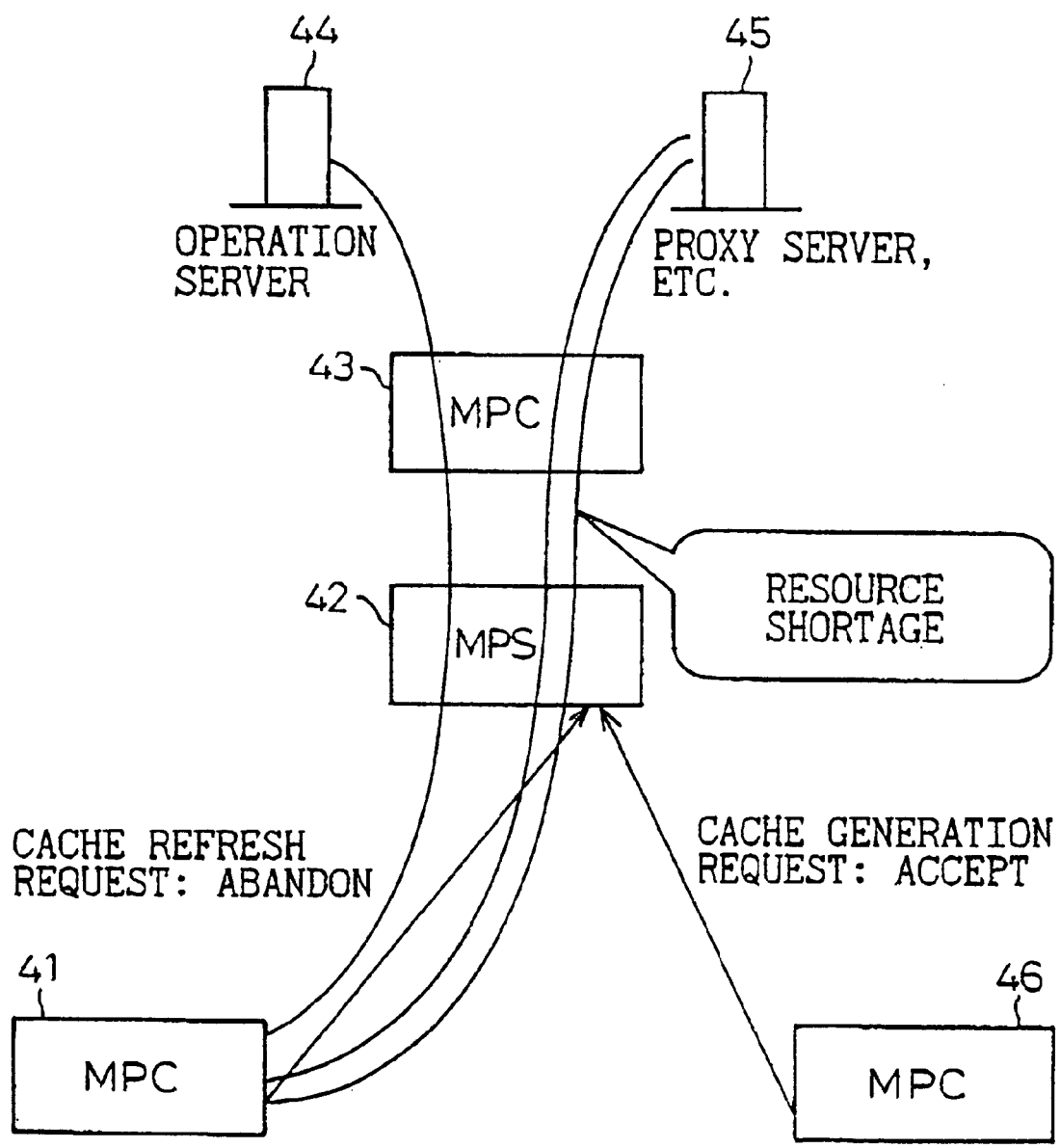

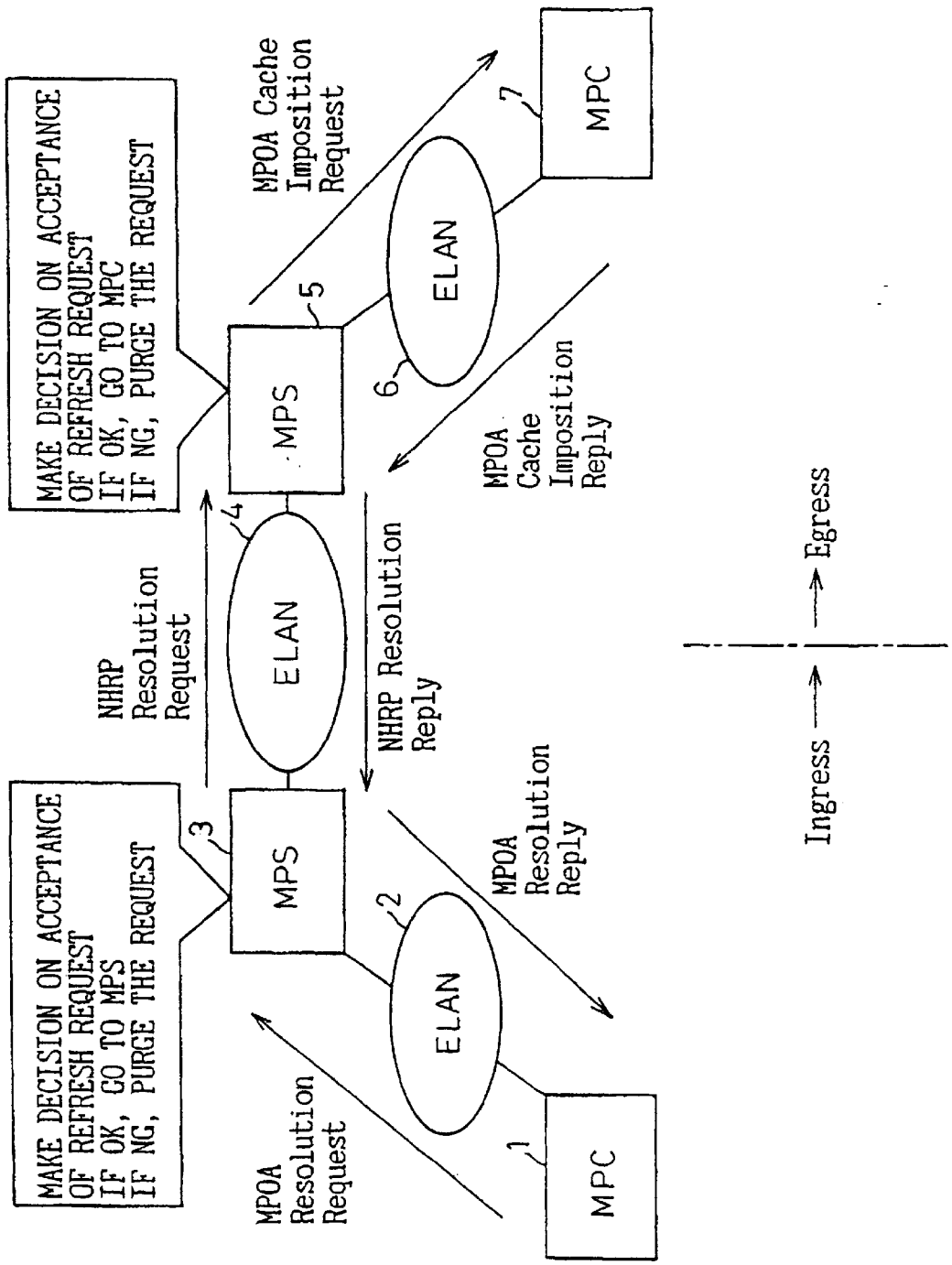

COMMUNICATION CACHE MANAGEMENT DEVICE AND METHOD THEREFOR

BACKGROUND OF THE INVENTION

1. Field of the Invention

The present invention relates to a network emulating a local network including an ATM-LAN (Asynchronous Transfer Mode Local Area Network), and relates, more particularly, to a communication cache management device including an MPOA (Multi Protocol Over ATM) cache management device that uses MPOA for efficiently transmitting LAN data within an ATM network, and a method for providing this communication cache management device.

2. Description of Related Art

In recent years, the development and introduction of an ATM network in the form of a backbone for multi-media application has progressed. In an ATM network, ATM transmission technologies are widely used for communicating LAN data, as represented by an Internet backbone, as well as for the communication of synchronous voice and images. Particularly, along with an extreme increase in the processing capacity of terminals, there has been desired a further increase in the transmission speed of the LAN data communication to allow application of the LAN over a wider range.

In the present invention, MPOA (Multi Protocol Over ATM) is used as a technique for achieving an efficient transfer of LAN traffic within the ATM network. According to MPOA, a physical ATM network is divided into a plurality of logical sub-networks, and a LAN emulation (ELAN (Emulated LAN)) is used in these sub-networks. For communications between ELANs that require routers, an MPOA connection resolution procedure is executed. Further, in order to resolve an ATM address of a destination ATM device, NHRP (Next Hop Resolution Protocol) and the like are used.

Based on the address information of a destination ATM device obtained by the address resolution, both transmitter and receiver ATM devices are directly connected together by a communication connection (shortcut) between ATM layers. As a result, it is possible to achieve a high-speed data transmission between ELANs without depending on the processing capacity of routers.

In MPOA, the communication connection obtained based on the address resolution is managed by caches. Specifically, as explained later, a cache is used at each position of an MPOA client (MPC: Multi Protocol Client) and an MPOA server (MPS: Multi Protocol Server) at a data entrance side (hereinafter to be referred to as an ingress) respectively and an MPC and an MPS at a data exit side (hereinafter to be referred to as an egress) respectively. For example, for achieving communications with the same destination ATM device, an ingress MPC can directly establish a connection with this ATM device over ELANs by referring to a cache inside the ingress MPC.

As methods for managing the caches, the specification of the MPOA (ATM Forum: AF-MPOA-0011) describes the following two methods. According to one method, a connection is disconnected at the same time when the time has run out (a method 1). According to another method, a connection is refreshed again after a lapse of two-thirds of a time-out period (a method 2). The contents of a cache are updated periodically in this way, and an unnecessary connection is abandoned at the same time.

FIG. 1A and FIG. 1B show one example of a conventional method of managing a cache.

FIG. 1A shows one example of the above method 1. At the time when a shortcut has been set to a cache, a timer (an aging timer) corresponding to this registered shortcut starts. This aging timer times out after a lapse of this aging time. As a result, the data on the registered shortcut is deleted from the cache. Then, a shortcut route for communication is disconnected and returned to a default side via the router.

FIG. 1B shows one example of the above method 2. At a point of time when two-thirds of an aging time has passed after an aging timer corresponding to a registered shortcut started, a cache refresh signal for a Timer Re-start is given. As a result, the cache-registered contents are automatically updated and maintained as far as there has been no change in the registered contents. At the same time, the aging timer is initialized and the timer starts counting the aging time again.

The above-described MPOA cache management methods, however, have the following problems. According to the method 1, when a time-out has occurred during a communication of the shortcut using a cache, the communication that uses a shortcut route is forcibly disconnected and returned to a default route via the router. As a result, a default communication starts which cannot sufficiently achieve the high-speed communication of the MPOA. This involves an occurrence of a sudden poor response in the middle of the communication.

On the other hand, according to the method 2, a communication connection once registered in a cache is refreshed periodically regardless of the presence or absence of communication thereafter. Therefore, this registration is maintained forever thereafter as long as there has been no change or release in the registered terminal. As a result, the number of caches that are not necessary increases in time. This makes it impossible to effectively utilize these caches. In the worst case, it is not possible to register a necessary shortcut.

SUMMARY OF THE INVENTION

In the light of the above problems, it is, therefore, an object of the present invention to provide a communication cache management device capable of achieving a highly efficient and high-speed communication based on the intrinsic characteristics of the communication, through more intelligent management of caches.

In order to meet the above object, according to one aspect of the present invention, there is provided a communication cache management device at an ingress communication client side, the communication cache management device comprising: a communication message processor that processes a communication message; a cache manager that manages an ingress cache based on a cache memory and an aging timer; and a flow monitor that monitors a data flow transmitted to an ingress communication server and that detects the data flow exceeding a predetermined threshold value within a predetermined flow monitoring period before a time-out of the aging timer after a shortcut has been set, wherein, upon reception from the flow monitor of a notice of a detection of a data flow exceeding the predetermined threshold value, the communication message processor transmits a communication address resolution request message to the ingress communication server, and, based on the contents of a response message from the ingress communication server, updates the contents of the cache memory in the cache manager.

Further, according to another aspect of the invention, there is provided a communication cache management device at a communication server side, the communication cache management device comprising: a communication message processor that processes a communication message; and a cache manager that manages a cache based on a reception processor and a cache memory, wherein the reception processor manages the contents of the cache memory by classifying the contents of the cache memory into groups having specific conditions, and upon reception from an ingress communication client a request message that requests for a resolution of a communication address, accepts said request message if the message meets said conditions and abandons said request message if the message does not meet said conditions.

Further, according to still another aspect of the invention, there is provided a method of managing a communication cache at an ingress communication client side, the method comprising the steps of: monitoring a data flow transmitted to an ingress communication server within a predetermined time period before a time-out of an aging timer after a shortcut has been set; re-starting said aging timer when there has been detected the data flow exceeding a predetermined value; and timing out said aging timer when there has been detected no data flow exceeding the predetermined value.

Further, according to still another aspect of the invention, there is provided a method of managing a communication cache at an ingress communication client side according to the above aspect, the method further comprising the steps of: transmitting a communication address resolution request message to an ingress communication server when there has been detected the data flow exceeding a predetermined value; re-starting said aging timer when the contents of a response message to the request message permit a cache refresh; and timing out said aging timer when the contents of a response message to the request message do not permit a cache refresh.

Further, according to still another aspect of the invention, there is provided a method of managing a communication cache at a communication server side, the method comprising the steps of: processing a communication message by a communication processor; classifying the contents of a cache memory into groups having specific conditions; and, upon reception from an ingress communication client a request message that requests for a resolution of a communication address, accepting said request message if the message meets said conditions and abandoning said request message if the message does not meet said conditions.

BRIEF DESCRIPTION OF THE DRAWINGS

The present invention will be more clearly understood from the description as set forth below with reference to the accompanying drawings.

FIG. 1A is a diagram that shows one example (a method 1) of a conventional method of managing a cache.

FIG. 1B is a diagram that shows another example (a method 2) of a conventional method of managing a cache.

FIG. 2 is a diagram that shows an example of a basic structure of an MPOA network.

FIG. 4 is a diagram that shows an example of a functional block structure of an ingress MPC.

FIG. 5 is a diagram that shows an example of a functional block structure of an MPS.

FIG. 6A is a diagram that shows one example of an ingress cache.

FIG. 6B is a diagram that shows one example of an egress cache.

FIG. 7A is a diagram for explaining a cache updating operation (1) according to the present invention.

FIG. 7B is a diagram for explaining a cache updating operation (2) according to the present invention.

FIG. 9 is a diagram that shows one embodiment of a cache updating control by an PMS within an ELAN area.

FIG. 10 is a diagram that shows one embodiment of a cache updating control by an PMS within an MPOA network.

DETAILED DESCRIPTION OF THE PREFERRED EMBODIMENTS

FIG. 2 shows an example of a basic structure of an MPOA network.

In FIG. 2, the MPOA network has a server/client structure consisting of MPOA servers (MPSs) and MPOA clients (MPCs). In the present example, an MPS 3 and an MPC 1 communicate with each other through an ELAN 2 that is a sub-network of a physical ATM network. Further, an MPS S and an MPC 7 communicate with each other through an ELAN 6 that is a separate sub-network of the ATM network. On the other hand, for carrying out communications between the two sub-networks, there is carried out address resolution using an NHRP between the MPS 3 and the MPS 5.

Figure 3A:
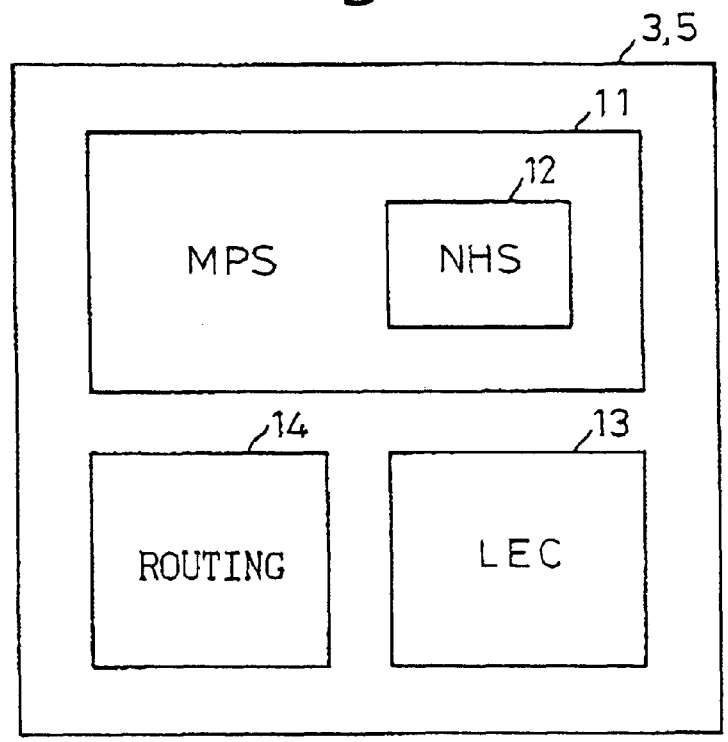
FIG. 3A is a diagram that shows an example (1) of a basic component of an MPOA network.
Figure 3B:
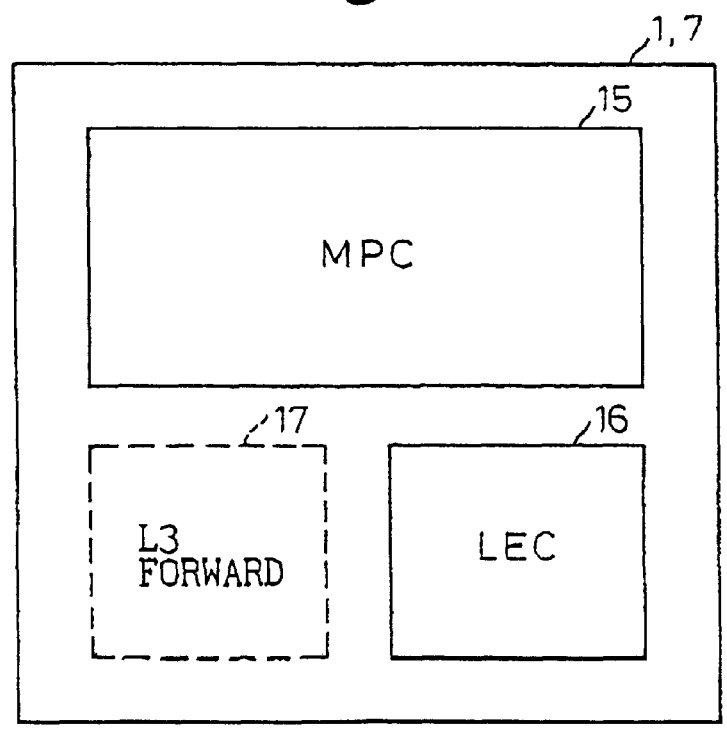
FIG. 3B is a diagram that shows another example (2) of a basic component of an MPOA network.

FIG. 3A and FIG. 3B show an example of the basic structure of each component that constitutes the MPOA network.

FIG. 3A shows an example of a block structure of the MPS. Specifically, a router is used as the MPS. The MPS consists of an MPS section 11 that executes an MPOA server function, an LEC (LAN Emulation Client) section 13 that executes a LAN emulation client function for achieving communications within the own sub-network, and a routing section 14 that executes a routing between sub-networks. Further, the MPS section 11 has an NHS section 12 that carries out an address resolution between the MPSs.

FIG. 3B shows an example of a block structure of the MPC. Specifically, an MPOA host such as an edge device like a hub or an ATM device is used for the MPC. The MPC consists of an MPC section 15 that executes an MPOA client function, and an LEC section 16 that executes a LAN emulation client function for carrying out communications within its own sub-network. When the MPC is an edge device, there is provided a layer-3 forwarding function 17 that carries out a replacement of MAC (Media Access Control) headers for performing communications with a terminal under the control of the edge device.

Although not shown in FIG. 3A and FIG. 3B, each sub-network is further provided with an LES (LAN Emulation Server) that carries out an address resolution based on a MAC-ATM address conversion within each area, a BUS (Broadcast and Unknown Server) that executes a broadcasting function or the like, and an LECS that manages addresses of these units. As is clear from the above structure, for achieving communications within each sub-network, there is used a LAN emulation based on the LEC sections 13 and 16 for the MPS and the MPC and the LES, the BUS and the LECS.

FIG. 4 shows one example of a structure of the functional block of the ingress MPC 1 located at the data input side (ingress).

Referring to FIG. 4, a cache manager 21 manages shortcut information obtained by the MPOA, and has a memory 25 that stores shortcut information and a timer 26 that counts an aging time of the shortcut information. A flow monitor 22 detects data flow forwarded to the router side, counts packets, and detects reception of an MPOA message.

An MPOA message processor 23 transmits and receives an MPOA message to be described later based on a result of a detection of the data flow from the flow monitor 22 and a received message, instructs a change-over of a route of a communication path based on the transmission/reception, and registers, updates and deletes the shortcut information to the cache manager 21. The cache manager 21, the flow monitor 22 and the MPOA message processor 23 correspond to the MPC section 15 in FIG. 3B.

The frame processor 24 has its one end Ethernet-connected to a LAN terminal that is under the control of the frame processor 24, with the other end connected to an ATM network. The frame processor 24 carries out a MAC-ATM address conversion, a disassembling/assembling of packets/cells, and a changeover of a communication path to a default (the router side) or a shortcut route according to an instruction from the MPOA message processor 23. The frame processor 24 forms a part of the LEC section 16 shown in FIG. 3B, and uses a LAN emulation for transmission/reception of data.

FIG. 5 shows one example of a functional block structure of the MPS.

Referring to FIG. 5, a cache manager 32 manages shortcut information obtained by an MPOA procedure, and has a memory 35 that stores shortcut information, and a reception processor 34 that accepts only the shortcut information based on a predetermined rule, according to the present invention, as described later. An MPOA message processor 31 transmits and receives an MPOA message, and registers, updates and deletes the shortcut information to the cache manager 21. Both the cache manager 32 and the MPOA message processor 31 constitute the MPS section 11 shown in FIG. 3A.

A routing processor 33 retrieves an inside routing table based on a destination address of a received data, and forwards the data to a corresponding sub-network (ELAN) through a default route. The routing processor 33 also transmits/receives an MPOA message to/from the MPOA message processor 31. Further, the routing processor 33 is included in the LEC section 13 (including the routing section 14).

FIG. 6A and FIG. 6B each show one example of a cache.

FIG. 6A shows an example of each of the ingress cache 25 in the cache manager 21 of the ingress MPC 1 and the ingress cache 35 in the cache manager 32 of the MPS 3 respectively. FIG. 6B shows an example of each of the egress cache 25 of the egress MPC 7 and the egress cache 35 of the egress MPS 5 respectively.

The ingress cache in FIG. 6A stores an ATM address of a router (the ATM address of the ingress MPS 3), and a destination IP (Internet Protocol) address of received data frames, as retrieval "keys". On the other hand, as "Contents" corresponding to the retrieval keys, this ingress cache stores an ATM address of the egress MPC 7 (a VCC value after the establishment of a shortcut), encapsulation information as header information to be added at the time of a frame transfer, and other information including a holding time/count value, etc.

The egress cache in FIG. 6B stores, as retrieval "Keys", a destination IP address of received data frames, ATM addresses of both the ingress and egress MPCS, and tag information as an option. On the other hand, as "Contents" corresponding to the retrieval keys, the egress cache stores LEC identification information (to be used for identification when a plurality of LECs are used), DLL header information to be added at the time of a shortcut communication, and other information including a holding time/count value, etc.

Referring back to FIG. 2, the address resolution protocol of the MPOA will be explained based on the above explanation.

In FIG. 2, when the destination MAC address of received data frames is not for the ingress MPS 3, the ingress MPC 1 judges that this is a communication inside the same ELAN 2. Then, the ingress MPC 1 sets a data direct VCC (Virtual Channel Connection) to between the MPC 1 and the LEC section of the destination MPC within the same ELAN based on a conventional LAN emulation, and transmits the data frames.

On the other hand, when the destination MAC address of received data frames is the ingress MPS 3, the ingress MPC 1 judges that the data frames are destined for another ELAN (ELAN 6 in this example) or to another sub-network. The frame processor 24 carries out a processing necessary for the LAN emulation, such as a MAC-control ATM address conversion, or the like, and thereafter, transmits these data frames to the ingress MPS 3 of the same ELAN 2 as a default route.

In this case, the information of the transmission destination is stored in the cache as key information. When shortcut information (IP/ATM address, etc.) for the egress MPC as the transmission destination already exists in the cache and also when this shortcut information can be used, priority is placed on this route.

The flow monitor 22 of the ingress MPC 1 counts the number of the data frames that are transmitted to the ingress MPS 3. When the number becomes equal to or above a predetermined threshold value within a predetermined period of time, the MPOA processor 23 generates an MPOA address resolution request in order to set a shortcut path, and transmits this request to the ingress MPS 3 through the ELA 2. When the MPOA message processor 31 has detected this MPOA address resolution request, the MFOA message processor 31 determines a network (the ELAN 6 in this example) to which the data frames are to be forwarded.

The MPOA message processor 31 converts the received MPOA address resolution request into an NHRP address resolution request in order to make it possible to have an interaction with an existing NHRP, and transmits the NHRP address resolution request to the egress MPS 5 as the routing destination. In order to guarantee the reception of a response to this request, the MPOA message processor 31 replaces the source address with the address of the MPS 3 of itself, and stores this address in the cache 35 as key information.

Based on the destination IP address of the received data frames, the egress MPS 5 makes a decision as to whether the data frames are for the edge device or the host within the same area (ELAN 6) as its own area. When the data frames are not for any one of them, the egress MPS 5 further forwards the data frames to a suitable router (Next Hop) by referring to a routing table. On the other hand, when the data frames are destined to the same area, the egress MPS 5 judges that the egress MPS 5 itself is the destination host egress MP5.

Having detected the NHRP address resolution request, the MPOA message processor 31 resolves the destination ATM address (the ATM address of the egress MPC 7 in the present example) to be used for the shortcut path. In this case, the MPOA message processor 31 also obtains DLL header information (the MAC address, type, etc.) of the destination host.

Then, in order to store in the egress cache of the egress MPC 7 the DLL information that is to be added to the data packet to be received later through the shortcut path, the MPOA message processor 31 generates an MPOA cache imposition request, and transmits this request to the egress MPC 7. These pieces of information are stored in the cache 35 as key information.

In the egress MPC 7, the MPOA message processor 23 searches the egress cache 25 upon detecting the MPOA cache imposition request. When the MPOA message processor 23 has decided that this request relates to an entry already existing, the MPOA message processor 23 updates the entry contents, and generates an MPOA cache imposition response in order to return "Called Party Number" address information that is included in a SETUP message at the time of a shortcut path communication.

When it is possible to secure new resources although the entry does not exist, the cache manager 21 registers a new entry, and the MPOA message processor 23 responds to the MPOA cache imposition request and posts the ATM address to the ingress MPC 1. On the other hand, when it is not possible to secure new resources, the MPOA message processor 23 returns an error code. These pieces of information are stored in the cache 25.

The above MPOA cache imposition response is converted into an NHRP address resolution response and an MPOA address resolution response at various points in the opposite route to that described above, and is then returned to the ingress MPC 1. The contents of the response included in the MPOA cache imposition response at the response transmitter side are stored as the "Contents" information of each cache.

Upon reception of the MPOA address resolution response, the ingress MPC 1 sets a shortcut path according to a signaling procedure (a SETUP message, etc.) of the ATM based on the address information of the egress MPC 7 included in the received response contents. When a corresponding shortcut (an existing data direct VCC) already exists and also when it is utilizable, this route is used with priority.

The cache updating operation in the ingress MPC according to the present invention will be explained next.

FIG. 7A and FIG. 7B are diagrams for explaining the cache updating operation according to the present invention.

As explained with reference to FIG. 1A, according to the conventional method 1, the aging timer starts at the same time when the shortcut has been set. When the aging timer times out (in about a few minutes to dozens of minutes), the shortcut information is forcibly deleted. On the other hand, the present invention shown in FIG. 7A uses the following method. When the shortcut has been set in the ingress MPC 1, the aging timer (T) 26 shown in FIG. 4 starts. A predetermined period of time t (t=T/3 in the present example) within the aging period before the aging period ends is allocated to a flow monitoring period.

When the flow monitor 22 has detected a data flow that exceeds a predetermined threshold value within the above flow monitoring period, the flow monitor 22 disables a timed-out output signal of the aging timer 26. In this way, the flow monitor 22 maintains the shortcut information and further prohibits a disconnection of the shortcut. At the age-out time, the aging timer 26 re-starts the counting of the aging time (T) (refer to ① in FIG. 7A).

According to the above operation of the present invention, it is possible to solve the problem of the conventional method 1 that when a time-out has occurred during the communication using the shortcut route, this communication is forcibly disconnected. Further, according to the present invention, the flow monitor 22 makes a decision on the time-out of the aging period by monitoring the data flow during the actual communication. Therefore, when the communication has already ended during the monitoring period, the flow monitor 22 times out the aging period in a similar manner to that of the conventional method (refer to ② in FIG. 7A), and deletes the unnecessary cache. When the flow monitor is set to a disable condition, the operation according to the conventional method 1 is effected.

FIG. 7A shows the principle operation of the present invention in that the aging control is autonomously carried out inside the ingress MPC 1. However, in the actual use of the cache updating method, it is necessary to make the ingress cache contents of the ingress MPC 1 coincide with the ingress cache contents of the ingress MPS 3. One embodiment of the present invention to meet this condition is shown in FIG. 7B.

FIG. 7B shows an operation corresponding to the operation of the conventional method 2. In the ingress MPC 1, when the shortcut has been set, the aging timer (T) 26 is started. A predetermined period of time t before the aging time finishes (t=T/3 in the present example) is allocated to the flow monitoring period. When the flow monitor 22 has detected a data flow Upon detecting a data flow that exceeds a predetermined threshold value during the flow monitoring period, the flow monitor 22 transmits the MOA address resolution request to the ingress MPS 3 in order to prohibit the age-out (refer to ③ in FIG. 7B). The ingress MPS 3 transmits the MPOA address resolution response to the ingress MPC 1 (refer to ④ in FIG. 7B).

The ingress MPC 1 has already confirmed the communication with the egress MPC in progress, and, therefore, the MPOA address resolution response becomes an affirmative response. Accordingly, upon reception of the response, the aging timer is re-started immediately. Based on the above arrangement, the shortcut information is refreshed periodically after a lapse of two-thirds of the aging time in a similar manner to that of the conventional method 2. Further, a disconnection of the shortcut is prohibited. On the other hand, when the end of the communication has been confirmed during a flow monitoring period, the MPOA address resolution request is not transmitted, and the aging time simply times out according to the conventional method 1.

Regarding the setting of the timer and the flow monitoring, when the monitoring time is set to t=T/3 and also when the flow monitoring is set to the disable condition (that is, refresh unconditionally), this becomes the setting of the conventional method 1. On the other hand, when the monitoring time is set to t=0, this becomes the setting of the conventional method 1.

As explained above, according to the present invention, at the ingress MPC 1 side, that is, at the communication originator side, it becomes possible to clearly distinguish a necessary cache from an unnecessary cache based on the actual communication. Thus, it is possible to achieve an effective utilization of caches. Further, as the flow monitor 22 does not always monitor the communication, it is possible to reduce the processing load of the CPU. Therefore, it is possible to solve all the problems of the conventional methods 1 and 2 which include a forced disconnection and return to a default route from the shortcut during a communication, an increase in the cache capacity, etc.

Figure 8A:
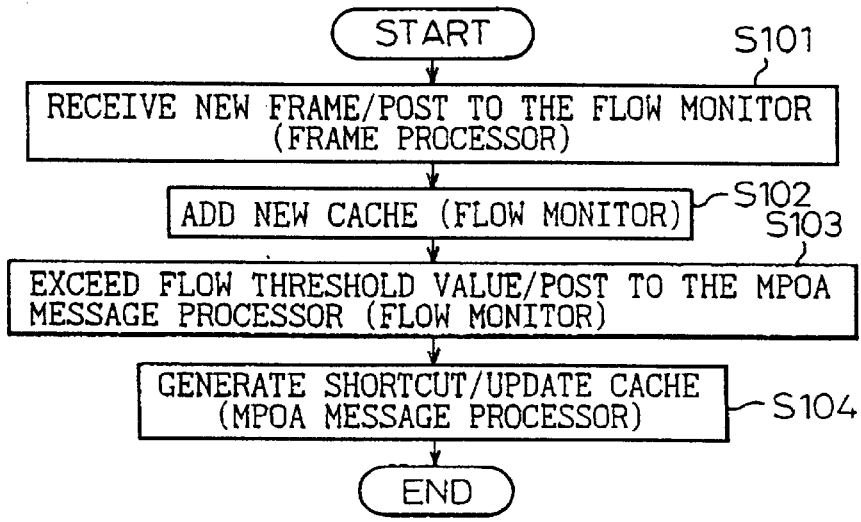
FIG. 8A is a diagram that shows an example of a cache control flow at the time of receiving a new frame of an ingress MPC.
Figure 8B:
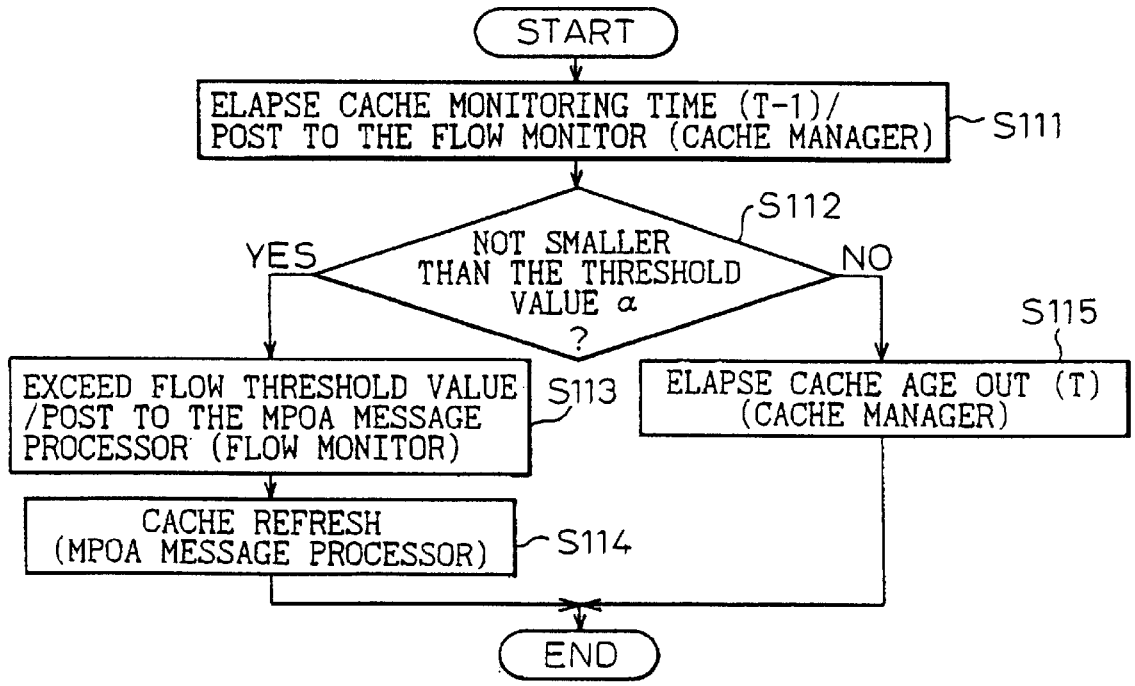
FIG. 8B is a diagram that shows an example of a cache control flow at the time of monitoring a flow of an ingress MPC.

FIG. 8A and FIG. 8B show examples of a cache control flow in the ingress MPC 1.

FIG. 8A shows an example of an additional flow of a new cache when a new frame has been detected, which is similar to the conventional technique. In other words, when the frame processor 24 has detected a new frame, the frame processor 24 posts this fact to the flow monitor 22 (S101). The flow monitor 22 requests the cache manager 21 for an addition of the new cache (S102). When a data flow that exceeds a predetermined threshold value has been detected, the flow monitor 22 also posts this to the MPOA message processor 23 (S103). The MPOA message processor 23 generates a shortcut according to the above-described MPOA process, and updates the cache contents (S104).

on the other hand, in FIG. 6B, the cache manager 21 posts a start of the flow-monitoring period to the flow monitor 22 (S111). When a data flow of a predetermined threshold value ($\alpha$) or above has been detected, the flow monitor 22 decides that communication is in progress, and posts this fact to the MPOA message processor 23 (S112 and S113). The MPOA message processor 23 refreshes the cache contents according to the process shown in FIG. 7B (S114). When the data flow is less than the predetermined threshold value ($\alpha$), the flow monitor 22 does nothing, and the timer ages out in the cache manager 21 (S115).

FIG. 9 and FIG. 10 show another embodiment of the present invention.

The embodiment explained above relates to the ingress MPC 1. However, in the present embodiment, the ingress MPS 3 relating to the ingress MPC 1 and/or the egress MPS 5 carry out/carries out cache control. With this arrangement, the MPS that has management information of the total network can suitably manage the cache information of each MPC based on this information. As a result, it becomes possible to achieve cache management of a higher level than that of the conventional management method. This makes it possible to realize a more efficient network communication.

As shown in FIG. 5, each cache manager 32 of the MPS 3 and the MPS 5 of the present invention has a reception processor 34. The reception processor 34 manages the contents of the ingress cache by classifying the contents into groups having specific conditions in advance. These conditions include, for example, "the number of refresh of the MPC", "the communication time zone", "the presence or absence of resources", "a unit of operating division", "the priority", etc.

When the MPOA address resolution request shown in FIG. 7B, that is, the cache refresh request, has been received from the ingress MPC 1, the reception processor 34 makes a decision to accept or abandon the request based on the above conditions. The reception processor 34 accepts, usually, only a cache refresh request that meets the conditions (cache refresh permission), and abandons a cache refresh request that does-not meet the conditions (cache refresh non-permission). To actually abandon the request, the reception processor 34 returns an MPOA address resolution response that contains an "error code".

FIG. 9 shows one example of the case where the present embodiment is implemented for communications within an ELAN area.

In FIG. 9, the reception processor 34 of an MPS 42 carries out an update control of a cache based on "the presence or absence of resources" and "the priority". In this example, an MPC 41 which consists of an edge device and an ATM host uses, by itself, an operation server 44 and a proxy server 45 that are LAN-connected under the control of a hub MAC 43 via a router MPS 42. At this time, the "resources" of the proxy server 45, that is, a global IP address and others are all being used.

In this case, a priority group (communication to operation terminals) and a non-priority group (other communications) are registered in the reception processor 34. During a certain period of time, there is room for resources. Therefore, the reception processor 34 permits each of the MPC 41 and an MPC 46 to have a shortcut for communications for access to the proxy server 45 other than the access to the operation server 44.

During of other times, the number of MPCs connected to the operation terminals increases, and the resources of the operation server 45 are decreased. In this case, the reception processor 34 of the MPS 42 makes a decision that the "resources" are in short supply. Also, by taking the "priority" into consideration, the reception processor 34 abandons the cache refresh of the communication that belongs to the non-priority group. With this arrangement, the resources of the non-priority group are released, and it becomes possible to accept a new request from the priority group.

FIG. 10 shows an example of the case where the egress MPC 5 also carries out a cache updating control in the MPOA network.

The operation of the ingress MPS 3 shown in FIG. 3A similarly applies to the operation explained with reference to FIG. 9. It is clear from FIG. 10 that the egress MPS S can carry out a similar operation to that explained for the ingress MPS 3 in the present embodiment.

As explained above, according to the present invention, it is possible to effectively utilize resources and to secure stable communication quality by intelligent execution of cache management of the MPOA, which it has not been taken into consideration in the past.

Further, according to the present invention, at the ingress MPC side, that is, at the communication originator side, it is possible to clearly distinguish a necessary cache from an unnecessary cache based on the actual communication, which makes it possible to effectively utilize caches. As a result, it is possible to prevent a forced disconnection from the shortcut during the communication and a return back to the default and to prevent an increase in the cache capacity.

Further, according to the present invention, the MPS that has management information of the total network can suitably manage the cache information of each MPC based on this information. As a result, it becomes possible to efficiently operate the whole network.

What is claimed is:

1. A communication cache management device at an ingress communication client side, the communication cache management device comprising:
   a communication message processor that processes a communication message;
   a cache manager that manages an ingress cache based on a cache memory and an aging timer; and
   a flow monitor that monitors a data flow transmitted to an ingress communication server, and that detects the data-flow exceeding a predetermined threshold value within a predetermined flow monitoring period before a time-out of the aging timer after a shortcut has been set, wherein, upon reception from the flow monitor of a notice of a detection of a data flow exceeding the predetermined threshold value, the communication message processor transmits a communication address resolution request message to the ingress communication server, and, based on the contents of a response message from the ingress communication server, updates the contents of the cache memory in the cache manager.

2. A communication cache management device according to claim 1, wherein the cache manager re-starts the aging timer when the contents of the response message show permission of a cache refresh, and times out the aging timer when the contents of the response message show the non-permission of a cache refresh.

3. A communication cache management device according to claim 1, wherein the cache manager times out the aging timer when a detection of a data flow that exceeds a predetermined threshold value has not been posted from the flow monitor.

4. A method of managing a communication cache at an ingress communication client side, the method comprising the steps of:

monitoring a data flow that is transmitted to an ingress communication server within a predetermined time period before a time-out of an aging timer after a shortcut has been set;

re-starting said aging timer when there has been detected the data flow that exceeds a predetermined value; and timing out said aging timer when there has been detected no data flow that exceeds the predetermined value.

5. A method of managing a communication cache at an ingress communication client side, the method comprising the steps of:

monitoring a data flow that is transmitted to an ingress communication server within a predetermined time period before a time-out of an aging timer after a shortcut has been set;

transmitting a communication address resolution request message to an ingress communication server when there has been detected the data flow that exceeds a predetermined value;

re-starting said aging timer when the contents of a response message to the request message permit a cache refresh; and timing out said aging timer when the contents of a response message to the request message do not permit a cache refresh.

* * * * *